REMOTE CONTROL SYSTEM FOR POWER SUPPLY AND VOLUME CONTROL

Filed Sept. 18, 1967

Inventors
GORDON E. REICHARD
WILLIAM H. SLAVIK
BY
Mueller, Aichele & Rauner
ATTYS.

United States Patent Office 3,537,012
Patented Oct. 27, 1970

3,537,012
REMOTE CONTROL SYSTEM FOR POWER SUPPLY AND VOLUME CONTROL

Gordon E. Reichard, Franklin Park, and William H. Slavik, Oak Lawn, Ill., assignors to Motorola, Inc., Franklin Park, Ill., a corporation of Illinois Filed Sept. 18, 1967, Ser. No. 668,368
Int. Cl. H04b *1/16*
U.S. Cl. 325—392 9 Claims

ABSTRACT OF THE DISCLOSURE

The system includes a detector to provide a DC voltage which is increased during the presence of a signal of one frequency and decreased during the presence of a signal of another frequency. An electronic switch in the power supply of a receiver to be remotely controlled is coupled to the detector and is closed by a predetermined level of the DC voltage to energize the receiver. The detector is also coupled to an attenuator in the audio portion of the receiver to increase the volume of sound as the DC voltage is increased beyond such level.

BACKGROUND OF THE INVENTION

Presently known systems for remotely controlling a television or radio receiver include a hand-held transmitter which radiates a number of control signals each of a different frequency. A control receiver located in the radio or television receiver responds to such signals to energize motors or stepping relays to rotate the channel selector, volume and hue potentiometers and the like. Some such systems include a switch connected in the receiver power supply and mounted on the shaft of the volume control motor or relay so that a transmitted signal of a particular frequency turns the shaft and closes the switch to turn on the receiver. Further transmission of that signal continues to rotate the shaft to increase the volume. Both stepping relay and motor driven volume controls are undesirable as being expensive and not very reliable. Also, the former type has a further disadvantage of incremental rather than continuous volume control. Adding an on-off switch to the volume control shaft is expensive and increases the unreliability so that remote control of the on-off function is not usually present.

The desirability of a remotely controlled on-off switch, however, is clear. For example, television sets in taverns or hospitals are usually located well beyond the reach of an individual so that it is necessary to provide a viewer accessible switch connected to the receiver by means of an unsightly and hazardous cable or by means of an inexpensive, reliable wireless control.

The advent of a circuit for developing a DC control voltage which is maintained for an indefinite period of time and the value of which may be changed according to the length of time a control signal is present, has made electronic control rather than motor or stepping relay control feasible. Such a circuit is shown and described in a copending application, Ser. No. 644,301, now abandoned assigned to the assignee of the present application.

A further consideration which must be taken into account is the number of functions to be controlled. The transmitter, in order not to be too large, can accommodate only a given number of frequencies, and in order to control the maximum number of functions, it would be desirable to use the same frequencies to control both the on-off and volume functions. Some presently used systems use a separate frequency to energize a stepping relay to turn the television receiver on and off. This requires additional selective circuitry in the receiver in addition to the added transmitter circuitry.

SUMMARY OF THE INVENTION

It is, therefore, an object of this invention to provide an all-electronic remote control system for turning a wave signal receiver on and off and providing continuous volume control in both directions (louder or softer) by the use of two frequencies.

Another object is to provide a remote control system of improved reliability and reduced cost.

In practicing a preferred form of the invention, a remote control system is adapted to receive first and second control signals of different frequencies. A detector circuit provides a direct current voltage which is increased according to the duration that the first signal is present and is decreased according to the duration that the second signal is present. An electronic switch coupled in the supply circuit of the wave signal receiver to be controlled has control means coupled to the detector circuit and is responsive to the direct current voltage exceeding a predetermined level to cause the supply circuit to apply an operating voltage to the wave signal receiver. An attenuation circuit is coupled in the audio circuit of the wave signal receiver and is coupled to the second circuit and is responsive to further increases in the direct current voltage beyond the predetermined level to increase the volume of sound emitted by such audio circuit by an amount related to the amount of such increase.

DETAILED DESCRIPTION OF THE PREFERRED EMBODIMENTS

Figures 1, 2:
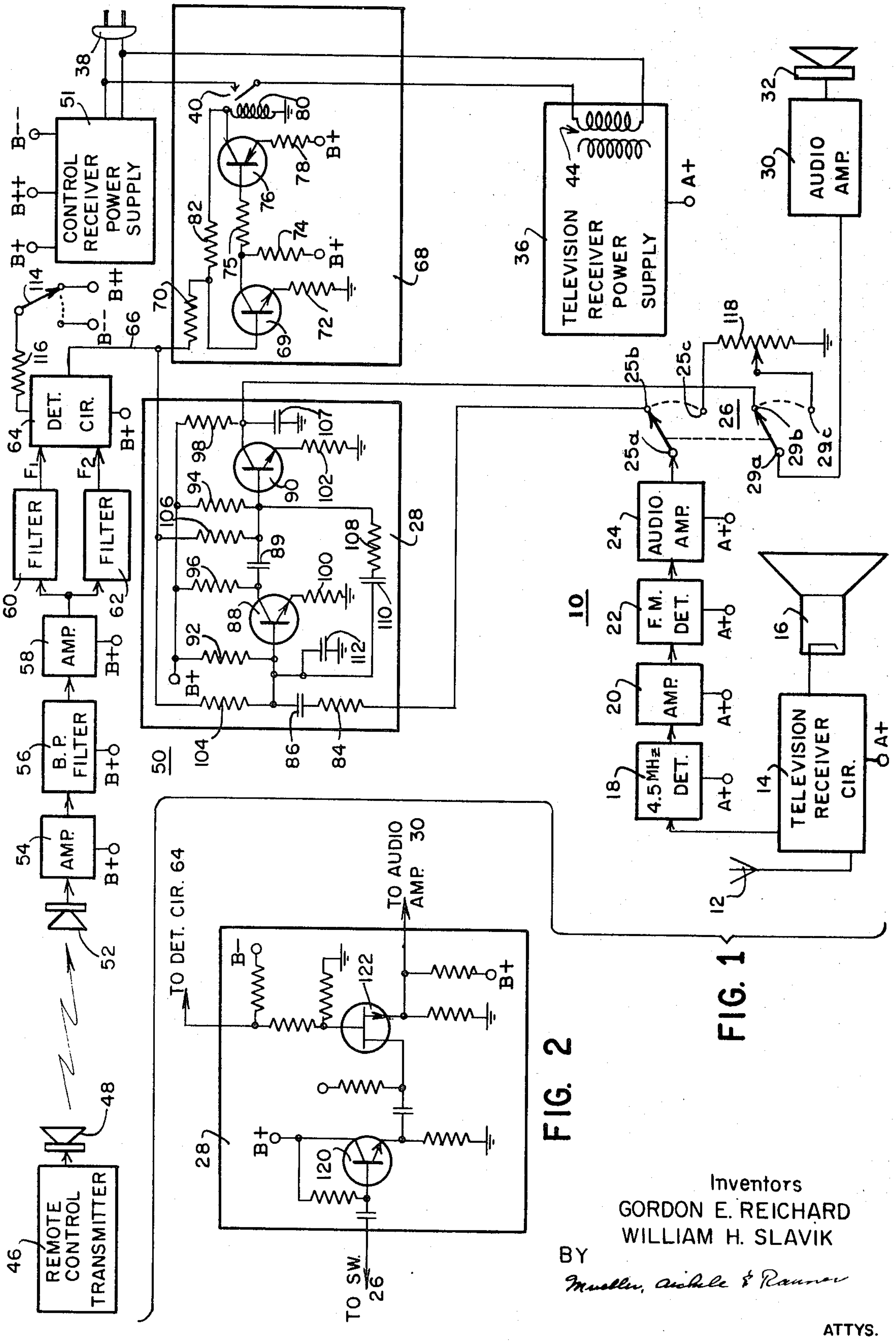
FIG. 1 is a diagram partially in schematic and partially in block of a system incorporating the features of the invention.
FIG. 2 illustrates another embodiment of an attenuator circuit which may be used in the circuit of FIG. 1.

Referring now to FIG. 1, numeral 10 indicates generally a television receiver which has a number of functions to be controlled from a remote location. This, of course, serves merely as an example since any wave signal receiver capable of emitting sound can be controlled according to the features of the invention. The receiver 10 includes an antenna 12 to pick up television signals, and a receiver circuit 14 which processes the television signals in a known manner to produce video information for a cathode ray tube 16. The receiver 10 also includes a detector 18 which heterodynes the picture carrier at 45.75 mHz. and the sound carrier at 41.25 mHz. to develop an intercarrier sound signal at 4.5 mHz. The intercarrier sound signal is amplified in amplifier 20 and is demodulated in FM detector 22 to develop audio signals. The audio signals are amplified in amplifier 24 and are coupled through a pair of contacts **25*a* and 25*b* of a double pole-double throw switch 26 to an attenuation circuit 28 which actually forms part of the remote control receiver to be explained hereinafter. The audio signals are then coupled through contacts 29*a* and 29*b* of switch 26, then further amplified in amplifier 30 and applied to speaker 32** which converts the audio signals into sound.

The receiver 10 also includes a power supply 36 which provides an A+ operating voltage for the components of the receiver 10. An AC voltage for the power supply 36 is derived from a wall outlet through a plug 38, a pair of contacts 40 which actually forms part of the remote control receiver to be explained hereinafter and into a power transformer 44.

The remote control system includes a hand-held transmitter 46 which has a number of buttons, for example, each corresponding to a control signal of a different frequency. As long as a button is depressed, the transmitter 46 generates an ultrasonic AC control signal emitted by speaker 48 at the particular frequency corresponding to such button.

The remote control system also includes a remote control receiver indicated generally by the reference numeral 50. The receiver 50 preferably has its own power supply 51 coupled directly to the plug 38 to provide continuous DC operating voltages for the receiver 50 even though the television receiver 10 is de-energized. The control signals picked up by a microphone 52 are amplified in amplifier 54 and only those within a selected range of frequencies are permitted to pass through bandpass filter 56. After further amplification in amplifier 58, only the control signal having a frequency $F_1$ is permitted to pass through filter 60, and only a control signal having the frequency $F_2$ is permitted to pass through filter 62. Filters 60 and 62 may comprise parallel resonant circuits tuned to frequencies $F_1$ and $F_2$ respectively. A complete remote control receiver may include further amplifiers such as amplifier 58 and further filters to pass other control signals of different frequencies to contol other functions than those that will be described hereinafter.

The remote control receiver 50 includes a detector circuit 64 which converts the control signals that pass through the filters into a direct current voltage on conductor 66. A form of such a circuit is shown in a copending application Ser. No. 644,301, assigned to the assignee of the present application. The DC voltage on conductor 66 will continue to increase as long as the control signal having a frequency $F_1$ is present, or in other words, as long as the corresponding button on the transmitter 46 is depressed. The DC voltage will continue to decrease as long as the control signal corresponding to frequency $F_2$ is present. Most important, the detector circuit 64 has the ability to maintain a particular DC voltage. Thus on conductor 66 is available a DC voltage which may be remotely increased or decreased and once the control signal is removed, the DC voltage remains at a particular value for prolonged periods of time.

Detector circuit 64 is coupled to an electronic switch circuit 68 which includes an NPN transistor 69 having its base coupled through resistor 70 to conductor 66, an emitter coupled through resistor 72 to ground, and a collector having a load resistor 74. A PNP transistor 76 has a base coupled through resistor 75 to the collector of transistor 69, an emitter coupled through a resistor 78 to B+, and a collector coupled through an energizing winding 80 of a relay which includes the contacts 40 and 42. When the button on transmitter 46 corresponding to $F_1$ is depressed, the DC voltage on conductor 66 increases, and when it reaches a predetermined level, preferably small, transistor 69 begins to conduct which causes transistor 76 to conduct which causes a voltage to be fed back through resistor 82 to cause transistor 69 to conduct harder, etc. Thus, transistor 76 becomes regeneratively conductive to provide current flow through winding 80 and close the contacts 40 to supply an AC voltage to the receiver power supply 36 and thereby develop an operating A+ voltage for the television receiver 10. When the DC voltage on conductor 66 drops below the predetermined level by depressing the button on transmiter 46 corresponding to the frequency $F_2$, the transistor pair 69–76 becomes regeneratively non-conductive to de-energize the winding 80 and open the contacts 40 to turn off the television receiver 10.

Conductor 66 is also coupled to the attenuation circuit 28 which is in turn coupled in the audio circuitry of the television receiver 10. Audio signals are coupled from audio amplifier 24 through contacts 25*a* and 25*b* of switch 26, resistor 84, DC isolation capacitor 86 to an amplifier transistor 88 the collector of which is coupled through DC isolation capacitor 89 to a further amplifier 90. The base biasing resistors 92 and 94, and the load resistors 96 and 98 are coupled to a B+ voltage from supply 51. The transistors respectievly have emitter resistors 100 and 102 to ground. The base of transistor 88 is coupled through a resistor 104 to conductor 66 and the base of transistor 90 is coupled through a resistor 106 to conductor 66. Capacitor 107 is a bypass for undesired high frequency signals (above the range of the audio signals).

Until the DC voltage on conductor 66 reaches the predetermined level previously discussed, the television receiver 10 is de-energized and therefore no audio signals are developed. As soon as the voltage reaches the predetermined level, the receiver 10 is turned on and audio signals are applied to the attenuator circuit 28. Further increase in the DC voltage increases the bias of transistor 88 and 90 to thereby increase their gain and cause higher amplitude signals to be fed to audio amplifier 30 which in turn increases the volume of the sounds emitted by speaker 32. As the DC voltage continues to increase, the volume likewise increases. In order to provide increased range, that is, cause a given increase in the DC voltage to provide less of an increase in the volume of the sounds, a feedback network comprising resistor 108 and capacitor 110 are coupled in series between the base of transistor 90 and the base of transistor 88. Resistor 108 and capacitors 110 and 112 also help to limit distortion. A given increase in the gain of transistor 88 causes the amplitude of the signal applied to the transistor 90 to increase. A part of this increase is fed back to the base of transistor 88 to reduce its input impedance and thus counteract to a small degree the increased gain of transistor 88 so as to increase the volume of sound to a lesser degree. It should be noted that the improvement in range has been effected without providing a path for the audio signals around the attenuator circuit 28, that is, they still must be coupled through transistor 90.

In order to decrease the volume, the button on transmitter 46 corresponding to the control signal having a frequency $F_2$ would be depressed until the volume reaches the desired level. Continuing to depress such button will lower the DC voltage on conductor 66 below the predetermined level and turn the receiver 10 off.

In order to permit local control of the volume and on-off functions, the standard volume control knob located on the television receiver is replaced with a single pole, double throw switch 114. Its center contact is coupled through a resistor 116 to the detector circuit 64 with the remaining contacts respectively coupled to a positive and negative DC voltage from control receiver power supply 51. In the position shown, the DC voltage on conductor 66 will increase to turn on the television receiver 10 and increase the volume according to the length of time the switch is in such position. Moving the switch 114 to the negative contact position will decrease the DC voltage on conductor 66 to lower the volume and finally turn off the receiver 10. It should be noted that the local control operation simulates the remote control operation so that there is complete compatibility between the two. This means that if the volume is set remotely, and it is then desired to switch to local operation, there is no initial change in volume which could be annoying. Additionally, no switch is required to change from remote to local operation.

However, in case of failure of the remote control receiver 50, the television receiver 10 includes a standard volume control potentiometer 118 and by movement of the double pole, double throw switch 26 to its other position, audio signals bypass the attenuator circuit 28 by flowing through contacts 25*a*–25*c* and 29*a*–29*c*. A similar protection for the on-off function may be provided by a manual on-off switch in circuit with the contacts 40 in electronic switch circuit 68.

As an example of another type of attenuator circuit 28 which may be used, reference is made to FIG. 2 wherein the audio signals are applied to an emitter follower transistor 120 to provide an impedance match to a field effect transistor (FET) 122. The base of transistor 122 is coupled to the detector 64 in order that the DC voltage may control the conduction between the pair of output electrodes. When the DC voltage is at a low value such conduction is a minimum so that the impedance to the audio signals is a maximum to provide maximum attenuation thereof. As the DC voltage is increased, this impedance decreases to increase the volume of the sounds emitted by the speaker 32.

What has been described, therefore, is an improved remote control system for controlling both the on-off and volume functions of a wave signal with two frequencies without the use of expensive and unreliable motors or stepping relays. In addition, the volume control is continuous and the system is usable in a standard receiver with a minimum number of changes.

We claim:

1. A remote control system for a wave signal receiver having a power supply circuit for applying an operating voltage to the receiver and an audio circuit for emitting sound, which control system includes in combination; first circuit means to provide first and second alternating current signals of different frequencies either of which may be present for a selected duration, second circuit means coupled to said first circuit means to generate a direct current control voltage which is increased according to the duration that the first signal is present and which is decreased according to the duration that the second signal is present, electronic switch means coupled in the supply circuit of the receiver and having control means coupled to said second circuit means and responsive to the direct current control voltage exceeding a predetermined level to cause the supply circuit to apply the operating voltage to the receiver, and third circuit means coupled in the audio circuit of the receiver and to said second circuit means and being responsive to a further increase in the direct current control voltage beyond said predetermined level to increase the volume of sound emitted by the audio circuit by an amount related to the amount of such increase.

2. The remote control system set forth in claim 1 wherein said electronic switch means includes; a relay having an energizing winding and contact means, said contact means coupling an AC line voltage to the power supply circuit, and semiconductor means coupled between said second circuit means and said energizing winding to supply sufficient power to said winding to close said contact means when the direct current control voltage exceeds said predetermined level.

3. The remote control system set forth in claim 2 wherein said semiconductor means includes; first and second transistors of opposite conductivity each having an input electrode and an output electrode, means direct current coupling said input and output electrodes of said first transistor respectively to said output and input electrodes of said second transistor, means coupling said input electrode of said first transistor to said second circuit means, and means coupling said output electrode of said second transistor to said energizing winding.

4. The remote control system set forth in claim 1 wherein the audio circuit of the wave signal receiver includes detector means to provide audio signals and a speaker to convert the audio signals into sound, and wherein said third circuit means includes; semiconductor amplifier means to attenuate the audio signals and having input and output circuits, means coupling the detector means to said input circuit and means coupling the output circuit to the speaker, bias means for establishing the gain of said amplifier means, and means coupling said second circuit means to said bias means to increase the gain of said amplifier means as the direction current control voltage is increased to thereby raise the volume of sound emitted by the audio circuit.

5. The remote control system set forth in claim 4 wherein said semiconductor amplifier means includes; first and second transistors each having input and output electrodes, means coupling the detector to said input electrode of said first transistor, means coupling the output electrode thereof to said input electrode of said second transistor, and means coupling said output electrode of said second transistor to said speaker.

6. The remote control system set forth in claim 5 wherein said second circuit means further includes; a network coupled between said input electrodes of said first and second transistor to lessen the increase in volume for a given increase in the direct current control voltage and to reduce distortion.

7. The remote control system set forth in claim 6 wherein said network includes; resistor means and capacitor means coupled in series between said input electrodes, and further capacitor means coupled from said input electrode of said first transistor to a ground reference potential.

8. The remote control system set forth in claim 1 further including; means to supply a positive and a negative direct current supply voltage, manual switch means located on the wave signal receiver and having a common terminal electrically coupled to said second circuit means, said switch means having a pair of further terminals individually coupled to the positive and negative supply voltages, said switch means being operative to supply either of said voltages to said second circuit means to change the value of said direct current control voltage and thereby provide local control of the power supply and audio circuits of the wave signal receiver.

9. The remote control system set forth in claim 1 wherein said third circuit means includes; an emitter follower transistor coupled to said detector means, a field effect transistor having an input electrode coupled to said emitter follower transistor and an output coupled to the speaker, said field effect transistor having a further electrode to control the impedance between said input and output electrodes, and means coupling said second circuit means to said control electrode to control the volume of sound emitted by the speaker.

References Cited

UNITED STATES PATENTS

| | | | |
|---|---|---|---|
| 2,834,879 | 5/1958 | Bauman | 325—139 |
| 3,027,497 | 3/1962 | Carlson et al. | 325—392 XR |
| 3,052,848 | 9/1962 | Marks | 325—392 |
| 3,098,212 | 7/1963 | Creamer | 325—391 XR |
| 3,218,558 | 11/1965 | Kieffer | 325—392 |
| 3,294,901 | 12/1966 | Stanghi | 325—391 XR |

ROBERT L. GRIFFIN, Primary Examiner

R. S. BELL, Assistant Examiner

U.S. Cl. X.R.

325—391, 403